United States Patent [19]

Smith

[11] Patent Number: 4,458,333
[45] Date of Patent: Jul. 3, 1984

[54] DOT MATRIX CHARACTER PRINTING USING CONSTRAINED MEMORY

[75] Inventor: Bruce A. Smith, Delray Beach, Fla.

[73] Assignee: International Business Machines Corporation, Armonk, N.Y.

[21] Appl. No.: 332,584

[22] Filed: Dec. 21, 1981

[51] Int. Cl.³ .............................................. G06F 3/14
[52] U.S. Cl. ................................... 364/900; 364/519; 364/523; 340/728; 340/748; 382/56; 400/121; 400/124; 400/70
[58] Field of Search ........... 340/146.3 MA, 750, 728, 340/748; 364/200, 900, 518, 519, 523; 400/121, 120, 124, 70

[56] References Cited

U.S. PATENT DOCUMENTS

| | | | |
|---|---|---|---|
| 3,471,848 | 10/1969 | Manber | 340/750 |
| 3,671,957 | 6/1972 | Kegelman | 340/750 |
| 4,028,731 | 6/1977 | Arps | 358/260 |
| 4,074,254 | 2/1978 | Belser | 364/900 |
| 4,117,470 | 9/1978 | Elliott | 340/750 |
| 4,146,874 | 3/1979 | Ide et al. | 340/146.3 |
| 4,181,973 | 1/1980 | Tseng | 364/900 |
| 4,284,362 | 8/1981 | Jackson et al. | 400/124 |
| 4,286,329 | 8/1981 | Goertzel | 364/900 |

FOREIGN PATENT DOCUMENTS 494230 9/1975 Australia .......................... 340/748

OTHER PUBLICATIONS

Reghbati, "An Overview of Data Compression Techniques", IEEE Computers, Apr. 1981, pp. 71-75.
Casey et al., Fifth International Conference on Pattern Recognition, Miami, Florida, Dec. 1980, FIG. 3.

*Primary Examiner*—Gareth D. Shaw
*Assistant Examiner*—Ronni S. Malamud
*Attorney, Agent, or Firm*—R. Bruce Brodie; H. Barron

[57] ABSTRACT

In a wire matrix printer control system, some characters from a finite alphabet are locally stored as compressed dot matrix objects reflectively symmetric about at least one axis. Upon being referenced and ascertained as a compressed object, the bits are applied to the printhead in column major order up to the axis of symmetry and then applied in reverse column major order. For uncompressed objects, the bits are applied only in column major order.

4 Claims, 7 Drawing Figures

ADDRESS TABLE AND CHARACTER GENERATOR STRUCTURES

FIG. 1 (PRIOR ART U.S. PAT. 4,284,362-FIG. 5)

WIRE FIRE AND INTERRUPT TIMINGS

ADDRESS TABLE AND CHARACTER GENERATOR STRUCTURES

DOT MATRIX CHARACTER PRINTING USING CONSTRAINED MEMORY

TECHNICAL FIELD

This invention relates to dot matrix printers having constrained memory for storing control instruction sequences and parameter data, such as type fonts, and more particularly, relates to the method and means for reconstituting locally stored compressed characters.

BACKGROUND

Although the cost of ROM memory per byte is decreasing, it remains a competitively significant factor in the design of microprocessor control logic driving wire matrix printers. Indeed, the prior art exemplified by Reghbati, "An Overview of Data Compression Techniques", IEEE Computers, Apr. 1981, at pp. 71-75, describes high density high capacity storage where billions of bytes can be crammed into the same memory or the amount of memory can be reduced for the same information volume. In high capacity storage, compression techniques of choice include special codes driven by source symbol statistics or selected enumerative or combinatorial attributes of source symbol strings. Relatedly, where two dimensional arrays of images are black/white encoded by means of black dots in an otherwise white field, the compression for high capacity storage uses special purposes statistical, predictive, or character recognition codes as found in Arps, U.S. Pat. No. 4,028,731, issued June 7, 1977; however, the implementation complexity and expense justifiable in the gigabyte volumes of on-line direct access storage might very well drive a utilizing printer subsystem out of the market.

THE INVENTION

The technical problem solved by this invention is to constrain local wire matrix printer microprocessor storage by compressing some characters from a finite alphabet by using their reflective symmetry. The method of the invention includes the step of prestoring only a portion of the dot matrix defining each compressible character, together with information designating at least one axis of reflective symmetry. Also, the reconstitution of the compressed object requires the additional steps of referencing the local store to extract characters in print serial order; ascertaining whether a referenced character is compressed; and applying the dots of each compressed referenced character to the printhead in column major order, and then applying the dots in reverse column major order. In all other cases, the dots are applied in column major order. There is a caveat, such compression may not be available for ideographic characters in oriental languages because ideographic characters include slight print or contour irregularities which have semantic significance, i.e., they lack reflective symmetry. Nevertheless, it has been found empirically that standard EBCDIC character sets permit vertical axis symmetry in approximately ½ the cases.

Reflective symmetry has been described in connection with the scaling of dot images. More particularly, Casey, et al., in the Fifth International Conference on Pattern Recognition, Miami, Fla., December, 1980, set out in FIG. 3 in a font rescaling algorithm, that an enlargement of a dot matrix may cause an object to become asymmetrical. Casey's cure was to recreate the object about a reflective symmetric axis. That is, in enlarging a dot matrix character, the staircase or other effect may skew an otherwise balanced character. However, this was a scaling correction issue. There was no storage and reflective reconstruction of compressed images with coded indication of expansion for printer purposes.

DESCRIPTION OF THE PREFERRED EMBODIMENT AND INDUSTRIAL EMBODIMENT

Figure 1:
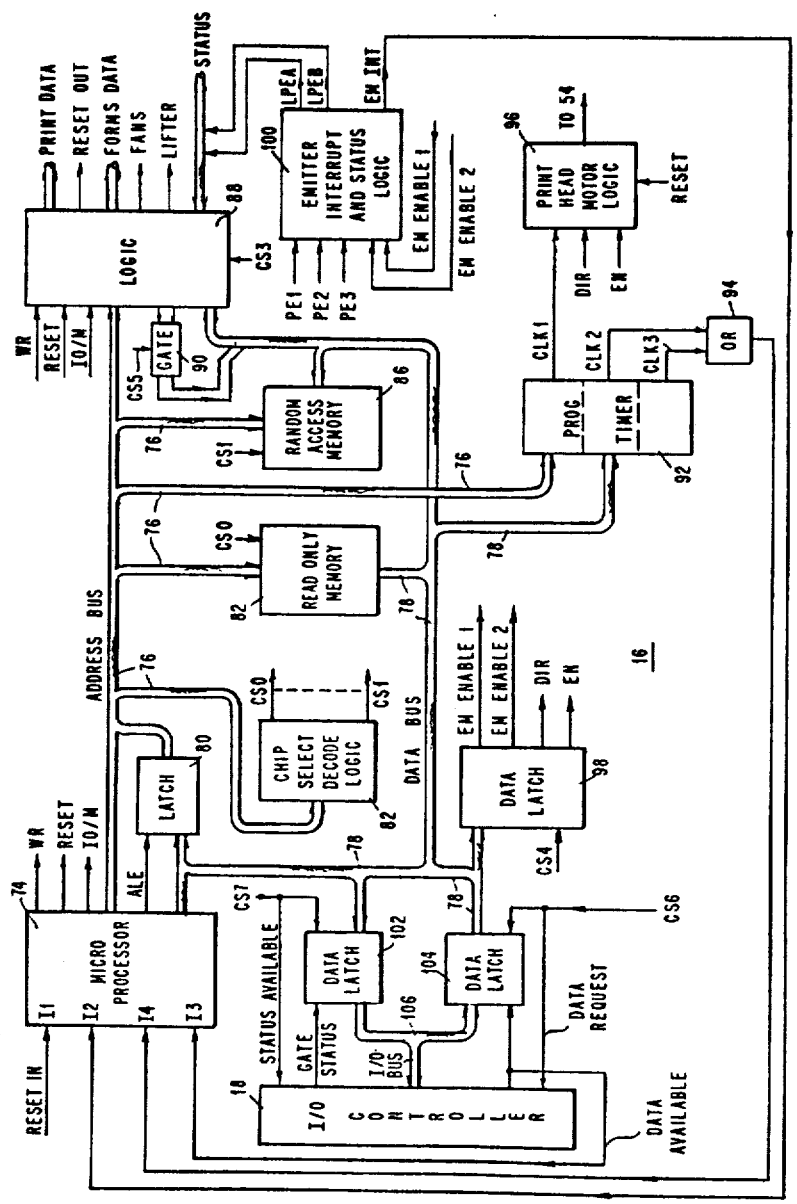
FIG. 1 is a block diagram of a microprocessor and associated control storage for regulating a wire matrix printer according to the prior art.

FIG. 1 depicts printer control logic for operating a wire matrix printer of the type described in Jackson, et al., U.S. Pat. No. 4,284,362, issued Aug. 18, 1981, and incorporated by reference herein. Briefly, the microprocessor 74 of the Intel 8085 type executes instruction sequences from a read only memory (ROM) 82 provided over a one byte wide data bus 78. The microprocessor produces control signals, such as WRITE, RESET and ALE, data, and addresses over respective dedicated wire paths, a two bytes wide address bus 76, and data bus 78. The microprocessor is priority interrupt driven over an ordered interrupt set of inputs I1, I2, I4, I3. Invocation of an interrupt will task switch a microprocessor from a current execution to another task by replacing the contents of the current instruction address register with a predetermined address. Since the invention relates to a method and means for reconstituting compressed characters from a constrained local memory which drive a wire dot matrix printhead, the remaining printer control unit details are omitted but may be referenced in the Jackson patent. For purposes of this invention, both the microcode sequences and characters used to drive the printer are stored in memory 82.

Figure 2:
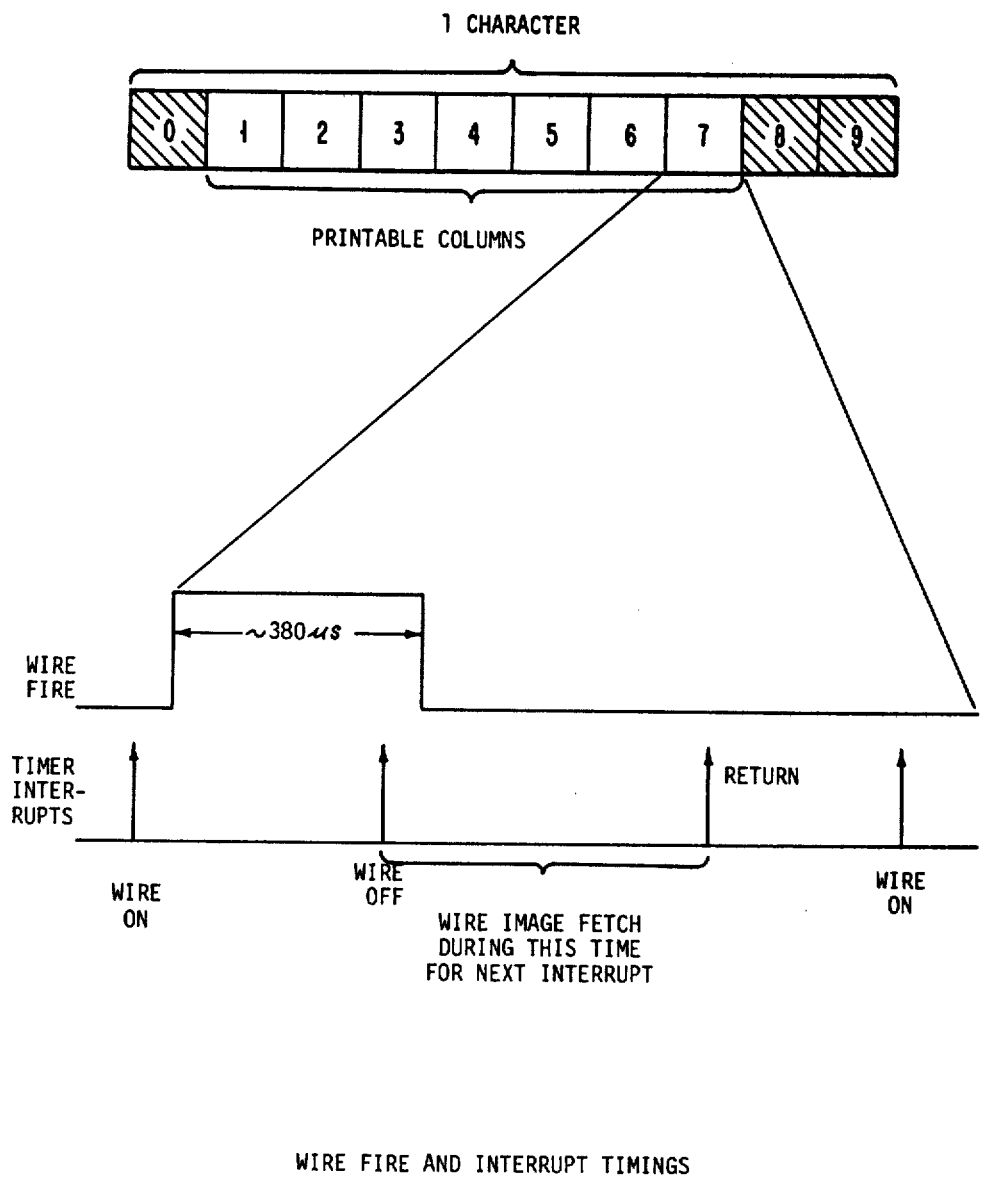
FIG. 2 depicts the wire fire and interrupt timings associated with a column orders bytes worth of bits applied to a wire matrix printhead.

Referring now to FIG. 2, there is shown wire fire and interrupt timing diagram with reference to the column positions of a single character. Each character consists of an 8×7 dot matrix array contained within an 8×10 array. The array is stored in the form of a column organized bytes. The zeros in each byte when applied to the printhead actuate counterpart wires to fire. The printhead is translated horizontally from left to right, and vis-a-vis, to print a line across a document. Printing is effectuated by the impact of pluralities of print wires, each of which is provided with a separate actuator arranged so when the actuator is energized, the associated printwire is driven forward to attack the paper. An inked ribbon is interposed between the document and the printwires. The impact of the printwire on the ribbon causes a dot to be printed at a selected point on the document. By energizing combinations of actuators, combinations of printwires can be imprinted corresponding to a selected character.

As shown in FIG. 2, the overall character matrix is divided into 10 columns. The printwires are fired only by the byte content in columns 1 through 7. The remaining 3 columns, 8, 9 and 0, constitute the intercharacter spacing. The character matrix is loaded into a print buffer of the RAM type which is byte accessed by the printhead and associated logic/control. However, the buffer size is small enough so that the pacing event is the wire-on/wire-off (wire firing cycle of the printhead). That is, character matrix processing is executed well within a wire fire cycle. It consists of fetching the header defining the next character or characters and ascertaining whether it is compressed or not and whether the column matrix requires wire fires.

Figure 3:
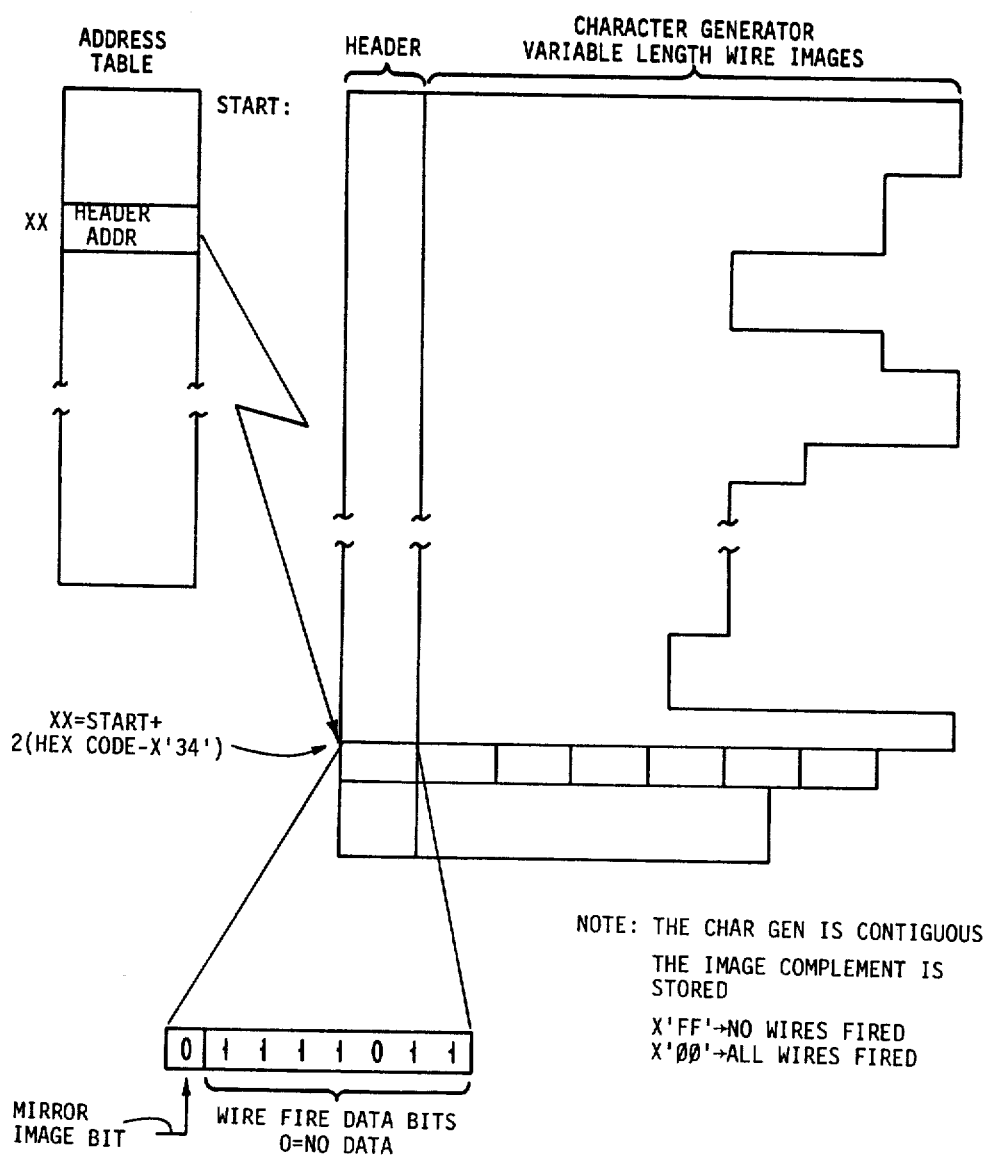
FIG. 3 schematizes the address table and character generator structures, of each locally stored character of a finite alphabet.

Referring now to FIG. 3, there is depicted the address table and the layout of characters in local ROM store. In this regard, each character is doubly indexed. For purposes of illustration, each character may be accessed by its ordinal location and the bytes defining the dot matrix are indexed along the abscissa. The 'xx' address consists of the table start location plus a displacement. The header consists of a single eight bit byte in which the first bit position defines whether the associated character matrix is compressed or not. The remaining seven bits of the header define whether the associated column byte contains bits requiring wire fires.

Referring now to FIGS. 4 through 7, there are shown flow diagrams defining location of the next character header determining whether it is a compressed character, and the remaining conditioning of the character prior to driving the printhead, i.e., all the processing must occur between the last wire-off and a time before the next wire-on. As mentioned, microprocessor 74 is interrupt driven such that an interrupt invokes the instruction sequence flow of FIGS. 4 through 7 and terminates the flow by a return to the background processing. Note in FIG. 3, processing begins with the invocation of an interrupt and terminates either with a return or is continued respectively in FIGS. 5 and 6.

Figure 4:
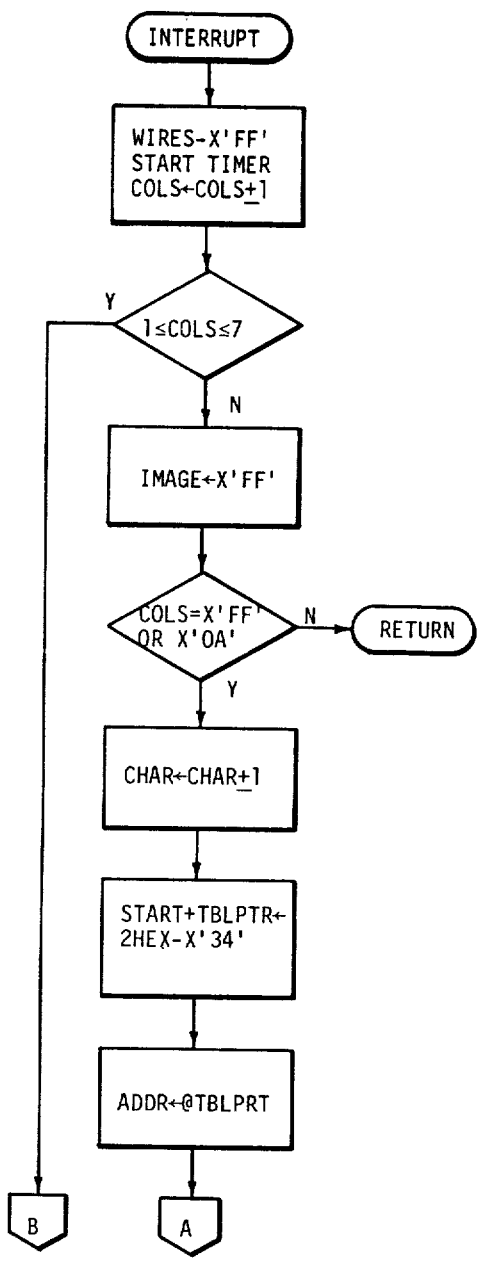
FIGS. 4-7 are flow diagram implementations of the method steps for referencing locally stored characters, ascertaining compression, and reconstituting said characters.

FIG. 4 flow chart is directed to column processing and is invoked at a wire-off interrupt. The first step is to start or restart the timer for wire fire, shut off the print wires, and update the column counter. The column counter variable is "COLS" and the updating of it is indicated by the symbol "+ − 1". It is then necessary to test whether the column counter is within the character width, that is to check for printable column positions 1 through 7. If the column count is between 1 and 7, then processing continues in the flow diagram represented in FIG. 6. If the column variable is outside the limits 1 to 7, then the nonprintable column is set up for null wire fire. This is done by assigning the hex code value x'FF' to the variable IMAGE. At this point, it is necessary to test whether a character boundary has been crossed. That is, whether the column counter COLS is 0, 8, or 9. If the boundary has not been crossed, then an unconditional jump or branch is executed by way of RETURN. If a boundary has been crossed, then a character counter CHAR is updated by incrementing or decrementing respectively by a+1 or a−1 depending on the print direction. The next two steps set up the image address table pointer, where START is the table starting address and HEX is the character code point in a predetermined table designated 037. The next step is to obtain the header and the first byte location of the character. This means that the data at the pointer is the address of the wire image header.

As previously mentioned, the header defines whether the associated character is compressed and whether the printable columns contain wire fire data or not, since the column count in this path started with the counter having crossed the character boundary and initializing steps have been taken to locate the header for the next character. Processing continues through connecter A with the flow diagram shown in FIG. 5.

Figure 5:
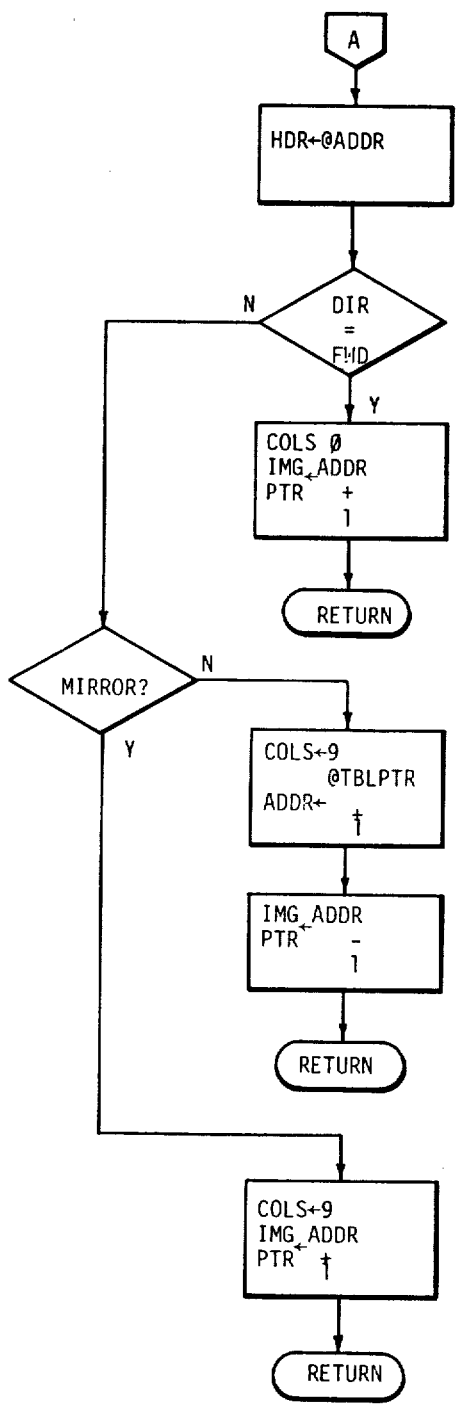

The processing path in FIG. 5 assumes that the column counter has crossed a character boundary. The first step is to save the image header for later access. The next step is to check for the direction of printhead travel. Modern printing by avoiding flyback time has nearly doubled its print rate by outputting characters in the right-to-left as well as left-to-right directions.

If the direction of travel is in the forward direction, i.e., left-to-right, it is necessary to set the image pointer to the address header location plus 1 since that represents the first image byte just beyond the header. Also the column counter COLS is set to zero. After this, the microprocessor may be switched to another task by way of the RETURN command.

If the direction of printhead travel is in the reverse direction, it is necessary to test whether the character to be extracted is compressed, i.e., needs to be mirrored or not. If it is an uncompressed character, then the column counter is set to 9 and the address register is set to obtain the address of the next header. Note that in printing in the reverse direction, the first wire image from right-to-left is ahead of the next header, therefore the image pointer is set to the address of the next header minus 1. A return may next be executed since the pointers are set up on the columns set to 9. Parenthetically, given that the character is compressed, the column counter COLS is set to 9 and the image pointer IMGPTR is set to the header address plus 1. With the exception of the column set up, a mirror image is accessed the same way in the forward as reverse directions.

Figure 6:
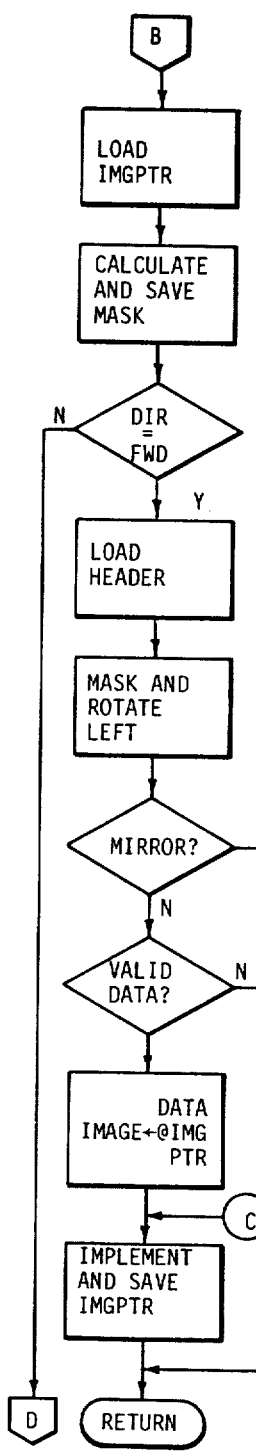

Referring now to FIG. 6, the program execution paths depicted therein are invoked from FIG. 4 where it was determined that the column counter COLS was within a printable column position (positions 1 through 7). The programming in FIG. 6 is directed to the byte-by-byte processing of the character matrix in column major order. If the character is compressed, then the bytes constituting the first image half are replicated to reconstitute the character for the second half in column order reversed.

It is necessary in printable column position processing to save the image pointer IMGPTR in a register pair for later use. Next, the header bits are masked off in order to expose the wire data bits or dots. Following a check for direction, a distinction in processing is made as a function of the print direction. If printing is in the forward direction, the header is loaded into the microprocessor accummulator. The header is then tested in order to ascertain whether the character is compressed or not. Since the header byte is to be tested in its entirety, a column by column processing is involved. Thus, if the image is compressed, it is necessary to ascertain whether in each column position a wire fire, that is bits or dots, are to be found for actuating the printhead. If there are none for a column, then an appropriate hex character indication x'FF' is assigned to the variable IMAGE. Subsequently, the microprocessor is task switched through a RETURN. If there is a wire fire for this column, the image pointer is incremented up to column 4 and decremented when at or beyond four and the data is saved. If the character is not a mirror image, and there is valid data, then the image pointer is incremented for the next access with the data being saved. When no data is present, the image pointer is not changed. Subsequent to this processing, the microprocessor is task switched to RETURN.

Figure 7:
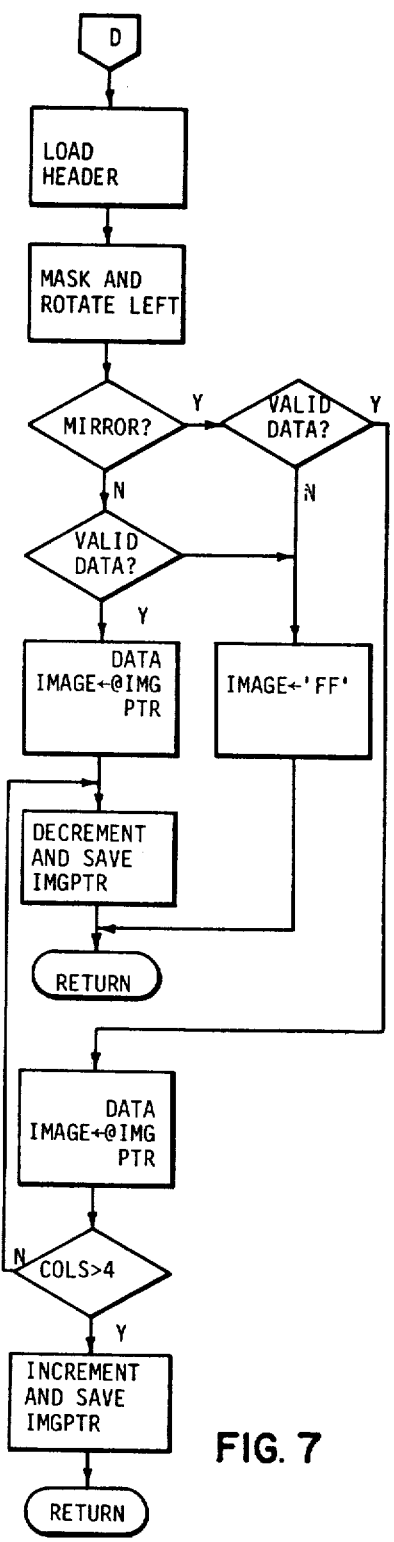

Referring now to FIG. 7, there is shown printable column position processing for printing in the reverse direction. Here it is desireable to retrieve the header saved when the character boundary was crossed. Next, the processor checks to ascertain whether the character is compressed. The processing path is next selected as to whether the image character is compressed or not and whether the column contains valid data bits. If this is not the case, a hexadecimal x'FF' wire fire will be set up. If the column valid data bit is a predetermined 1, then a retrieval of the image designated by the register pair for the next wire fire will be made. Additionally, when printing right-to-left, the columns are read backward so that the image pointer is decremented after each wire fire.

It should be appreciated that a header byte before each wire image includes 7 low order bits which identify the bytes of the wire image actually involved in firing the print wires. Any column of a character that has no wire fires is represented by a zero in the header byte. This eliminates all of the unused bytes in each character. Also, the most significant bit of the image header is used to indicate if the character is compressed about its vertical axis of symmetry.

It will be further understood by those skilled in this art, that various other changes in the form and details may be made therein without departing from the spirit and scope of the invention.

I claim:

1. In a printer in which some characters from a finite alphabet are locally stored as compressed dot matrix objects, all characters being selectively accessed from the store and applied to a movable wire matrix printhead, a method for reconstituting compressed objects comprising the steps of:

prestoring at least a portion of the dot matrix defining each alphabetic character together with information designating the compression status of the character about at least one axis of reflective symmmetry;

referencing the local store to extract characters in print serial order;

ascertaining whether a referenced character is compressed; and applying the dots of each compressed referenced character to the printhead in column major order and then applying the dots in reverse column major order, otherwise applying the dots only in column major order if the referenced character is not compressed.

2. A method according to claim 1, wherein the information designating character compression status also includes information defining whether the associated column bytes designate wire fires by the printhead.

3. A method according to claim 1, wherein the axis of reflective symmetry is vertical.

4. In a printer in which some characters from a finite alphabet are locally stored as compressed dot matrix objects, all characters being selectively accessed from the store and applied to a movable wire matrix printhead, a method for reconstituting compressed objects comprising the steps of:

prestoring at least a portion of the dot matrix defining each character together with information designating the compression status of the character about at least one axis of reflective symmetry, whether the associated matrix column bytes indicate printhead wire fires, and the starting location for the header and the contiguous matrix byte locations;

referencing the local store to extract characters in print serial order;

in between consecutive wire-on wire-off times, processing the header of the next character and ascertaining whether the referenced character is compressed and ascertaining whether the associated column byte defining the character contains bits requiring wire fires, and the direction of printhead movement; and applying bits to the printhead of each compressed referenced character in column major order, and then applying the bits in reverse column major order, otherwise applying the bits only in column major order to the printhead.

* * * * *